July 7, 1942.  M. K. LEGGETT  2,288,723

OVERHEAD TROLLEY WIRE SYSTEM

Filed Nov. 5, 1941

Inventor
MORTIMER K. LEGGETT

Attorney

Patented July 7, 1942

2,288,723

UNITED STATES PATENT OFFICE 2,288,723

OVERHEAD TROLLEY WIRE SYSTEM

Mortimer K. Leggett, Mansfield, Ohio, assignor to The Ohio Brass Company, Mansfield, Ohio, a corporation of New Jersey Application November 5, 1941, Serial No. 417,916

3 Claims. (Cl. 191—40)

My invention relates to means to support the trolley wires in an overhead trolley system and has particular reference to the operation of trolley bus systems in which two parallel trolley wires are used, of opposite polarity.

These wires are suspended, as a rule, from cross-span wires and in some cases these span wires are insulated and individually employed as current feeders to the trolley wires. These span wires usually sag, making it necessary to provide means to bring the trolley wires into a common horizontal plane. Devices for a like purpose have been employed in the past, but my invention I consider an improvement over the same in several respects, and have incorporated therein several new and novel features.

One object of my invention is to provide means for the purpose stated in which there is no member extending transverse to the direction of travel of the vehicle, except the span wire. This avoids injury to the parts, including the span wire, as they are out of the path of a flying trolley pole, except the cross-span and it is not subject to breakage as it is bendable and flexible and causes the trolley pole to rebound.

Another object of my invention is to provide supporting means for the trolley wires, which will be less unsightly than prior arrangements. This is true of my device as all the parts, except the cross-span, extend parallel to and closely adjacent to the trolley wires, and hence are less conspicuous than if they extended normal to the trolley wires.

My invention, also, has for another object, the provision of means to amply insulate one trolley wire from the other, when one wire is connected to the feeder conductor and receiving current therefrom.

My invention resides in the new and novel construction, combination and relation of the parts clearly shown in the accompanying drawing and fully disclosed in the specification.

In the drawing—

Figure 1:
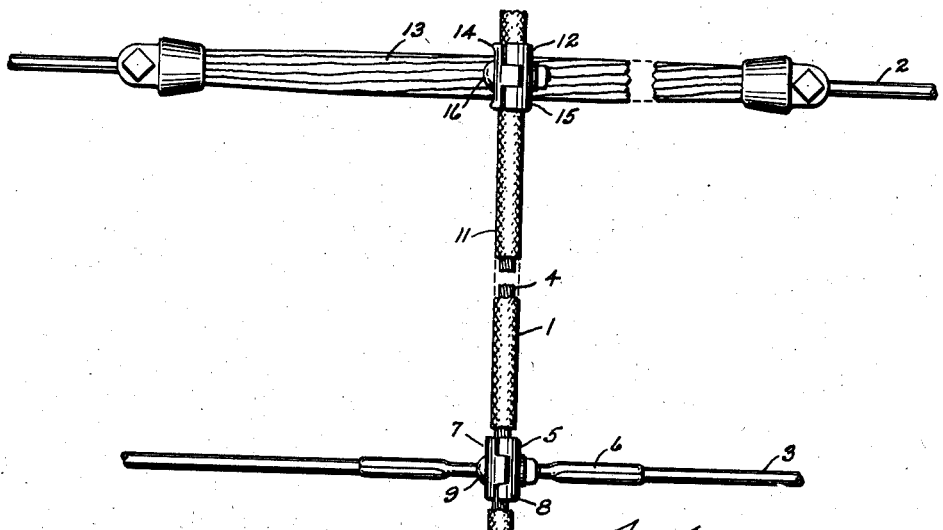
Fig. 1 is a top plan view of my invention.
Figure 2:
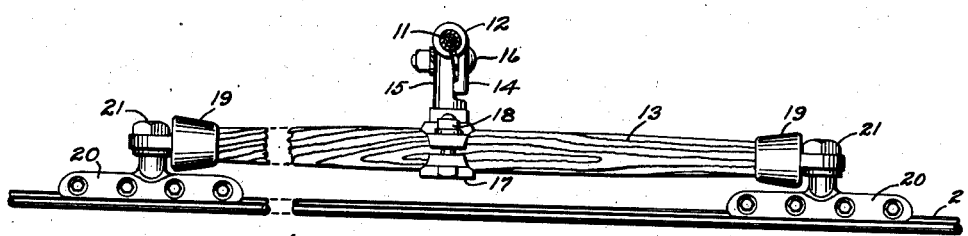
Fig. 2 is a side view of Fig. 1 looking toward the insulating member and its trolley wire.
Figure 3:
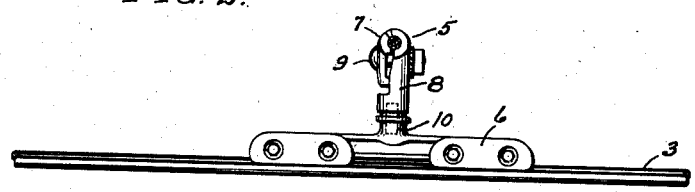
Fig. 3 is a side view of Fig. 1 looking toward the live member and its trolley wire.
Figure 4:
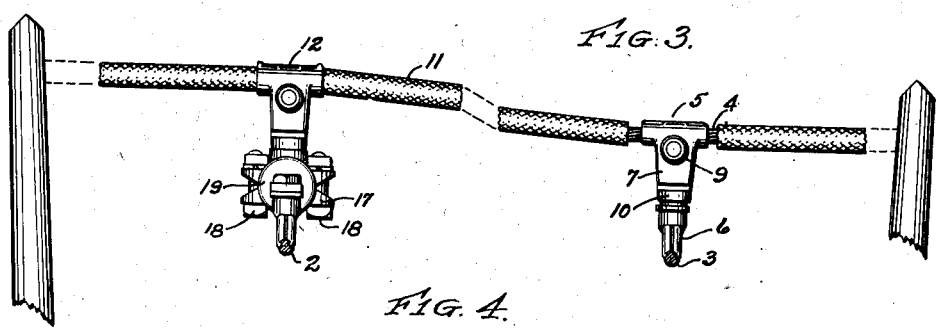
Fig. 4 is an end view of my invention shown in Fig. 1, looking in the direction of travel of the vehicle.

The insulating member and the cross-span feeder cable are shown broken to permit enlarging the details of the parts in the several views.

In the preferred embodiment of my invention, there is provided a cross-span feeder cable 1, usually insulated and having its ends secured to spaced supports positioned on each side of the trolley wires 2 and 3. The cable has a conductor 4 which is connected to one pole of a source of current supply.

The feeder cable invariably sags and, therefore, if the trolley wires were each suspended from the cable by means of equal length, the trolley wires would be in different horizontal planes, which practice has proved to be a disadvantage to an efficient operation.

The cable conductor 4 is bared at one point and a suspension member 5 clamped thereto and which is attached to the trolley support 6. The member 5 includes clamping members 7, 8 and 9, in which the member 8 is provided with means such as a threaded stud 10 connecting it to the trolley clamp or support 6.

The trolley clamp or support 6 is of a well-known type of which many thousands are in use. The clamp 6 being connected to the conductor 4 by a metallic connection through the medium of the metallic suspension 5, trolley wire 3 is fed or energized from the conductor 4.

The insulation 11 on the cable 1 is left intact at the point of connection thereto of the suspension clamp 12 which offers insulation between the trolley wires in addition to that of the insulating member 13. The cable maintains the spacing of the trolley wires.

The clamp 12 includes members 14, 15 and 16 in which the member 15 is attached to the insulating member 13 by means of the clamping member 17 and bolts 18. The point of attachment is intermediate the ends of the insulating member, usually mid-way. The member 13, as a rule, is of wood, which is found less expensive than fibre or molded composition and is much more reliable.

To the ends of the member 13 are secured terminals 19, which in turn are attached to the trolley wire supports or clamps 20 by means of cap-screws 21. It will be apparent that the insulating member 13 is directly over and parallel to the trolley wire 2 and the clamp 6 is directly over and parallel to the trolley wire 3, and, therefore, are less conspicuous and less subject to injury from flying trolley poles than if positioned parallel to the cross-span cable 11.

What I desire to cover by Letters Patent and claim is:

1. An overhead trolley system comprising in combination an insulated cross-span feeder cable, the conductor of which is connected to a source of current supply, means to support the cable, a pair of spaced trolley wires, suspension means for the trolley wires to suspend the trolley wires from the cable, the said means in one case comprising a clamp attached to the cable conductor and to supporting means attached to one of the trolley wires and positioned over the trolley wire and parallel thereto whereby the trolley wire is energized from the feeder cable, the aforesaid suspension means in the other case comprising a clamp attached to the feeder cable in insulated relation to the conductor thereof, an elongated insulating member suspended from the last said clamping means and positioned over and in parallel relation to the other trolley wire, and supporting means attached to each end of the insulating member and to the said other trolley wire and positioned over the trolley wire and parallel thereto, the said suspension means being of such relative length as to compensate for the sag in the cross-span feeder cable whereby the trolley wires will be suspended in substantially the same horizontal plane.

2. An overhead trolley system comprising in combination, a cross-span feeder cable provided with a conductor, a pair of parallel trolley wires, means to suspend one trolley wire from the cable comprising an elongated rigid bar of insulating material positioned over and parallel with one trolley wire, trolley wire supports attached to the ends of the bar and to the trolley wire, suspending means for the bar, the said means attached to the cable and, also, to the bar intermediate its ends, means positioned over and parallel to the other trolley wire to suspend the other trolley wire from the cable, the last said means, also, attached to the cable conductor whereby the said other trolley wire is fed current from the cable conductor, the said suspending means for the trolley wires being of such relative length that the trolley wires will be disposed in a common horizontal plane.

3. An overhead trolley system comprising in combination a pair of parallel trolley wires, an elongated insulating bar positioned over and parallel to one trolley wire and having suspension means at the ends of the bar to attach to and support the trolley wire, suspension means positioned over and parallel to the other trolley wire to support the trolley wire, a cross-span feeder cable provided with a conductor positioned over and transversely disposed to both trolley wires to support the trolley wires and maintain them in spaced relation, means attaching the insulating bar to the cable in insulated relation to the cable conductor and means attaching the second said suspension means to the cable in electrical connection with the conductor whereby the second said trolley wire is fed therefrom, the suspension means for the respective trolley wires being so constructed that the trolley wires may be suspended in a common horizontal plane.

MORTIMER K. LEGGETT.